US009505054B2

(12) United States Patent
Yamaguchi et al.

(10) Patent No.: US 9,505,054 B2
(45) Date of Patent: Nov. 29, 2016

(54) INJECTION APPARATUS

(71) Applicant: KABUSHIKI KAISHA TOYOTA JIDOSHOKKI, Kariya-shi, Aichi (JP)

(72) Inventors: Kazuyuki Yamaguchi, Aichi (JP); Kazuki Funahashi, Aichi (JP)

(73) Assignee: KABUSHIKI KAISHA TOYOTA JIDOSHOKKI, Kariya-shi, Aichi (JP)

( * ) Notice: Subject to any disclaimer, the term of this patent is extended or adjusted under 35 U.S.C. 154(b) by 194 days.

(21) Appl. No.: 14/408,613

(22) PCT Filed: May 30, 2013

(86) PCT No.: PCT/JP2013/065008
§ 371 (c)(1),
(2) Date: Dec. 17, 2014

(87) PCT Pub. No.: WO2013/190970
PCT Pub. Date: Dec. 27, 2013

(65) Prior Publication Data
US 2015/0196953 A1    Jul. 16, 2015

(30) Foreign Application Priority Data

Jun. 21, 2012 (JP) .................................. 2012-139270

(51) Int. Cl.
*F16D 31/02* (2006.01)
*B22D 17/20* (2006.01)
(Continued)

(52) U.S. Cl.
CPC ............. *B22D 17/203* (2013.01); *B22D 17/10* (2013.01); *B22D 17/2015* (2013.01); *B22D 17/32* (2013.01); *F15B 7/001* (2013.01); *B29C 45/531* (2013.01); *B29C 45/82* (2013.01)

(58) Field of Classification Search
CPC ........... F15B 7/001; F15B 7/10; B22D 17/32
See application file for complete search history.

(56) References Cited

U.S. PATENT DOCUMENTS 7,124,581 B2 * 10/2006 Dantlgraber ............ B29C 45/07
60/560
9,181,016 B2 * 11/2015 Yamaguchi ............ B22D 17/32
(Continued)

FOREIGN PATENT DOCUMENTS

JP      01-146721 A    6/1989
JP      02-148766 U    12/1990
(Continued)

OTHER PUBLICATIONS

Communication dated Jan. 29, 2016 from the European Patent Office in counterpart application No. 13806501.6.
(Continued)

*Primary Examiner* — Michael Leslie
(74) *Attorney, Agent, or Firm* — Sughrue Mion, PLLC

(57) ABSTRACT

In an injection apparatus, a first cylinder and second cylinder for driving an injection cylinder connected to an injection plunger are connected in parallel with each other with respect to the injection cylinder. A piston of the first cylinder and a piston of the second cylinder are synchronously driven by driving means. A directional control valve and first flow rate adjustment circuit are provided between one end of the injection cylinder and one end of the first cylinder. Moreover, second flow rate adjustment circuit is provided between the other end of the injection cylinder and the other ends of the first and second cylinders.

3 Claims, 1 Drawing Sheet

(51) Int. Cl.
  *F15B 7/00*   (2006.01)
  *B22D 17/32*  (2006.01)
  *B22D 17/10*  (2006.01)
  *B29C 45/82*  (2006.01)
  *B29C 45/53*  (2006.01)

(56) References Cited

U.S. PATENT DOCUMENTS

2009/0242161 A1* 10/2009 Uchida .................. B22D 17/32
                                                        164/113
2014/0131391 A1*  5/2014 Yamaguchi ............ B22D 17/32
                                                        164/113
2015/0165522 A1*  6/2015 Yamaguchi ............ B22D 17/32
                                                        164/149

FOREIGN PATENT DOCUMENTS

| | | |
|---|---|---|
| JP | 08-71725 A | 3/1996 |
| JP | 2006-240087 A | 9/2006 |
| JP | 2010-115683 A | 5/2010 |
| WO | 2013/005598 A1 | 1/2013 |

OTHER PUBLICATIONS

International Search Report of PCT/JP2013/065008 dated Aug. 6, 2013.

* cited by examiner

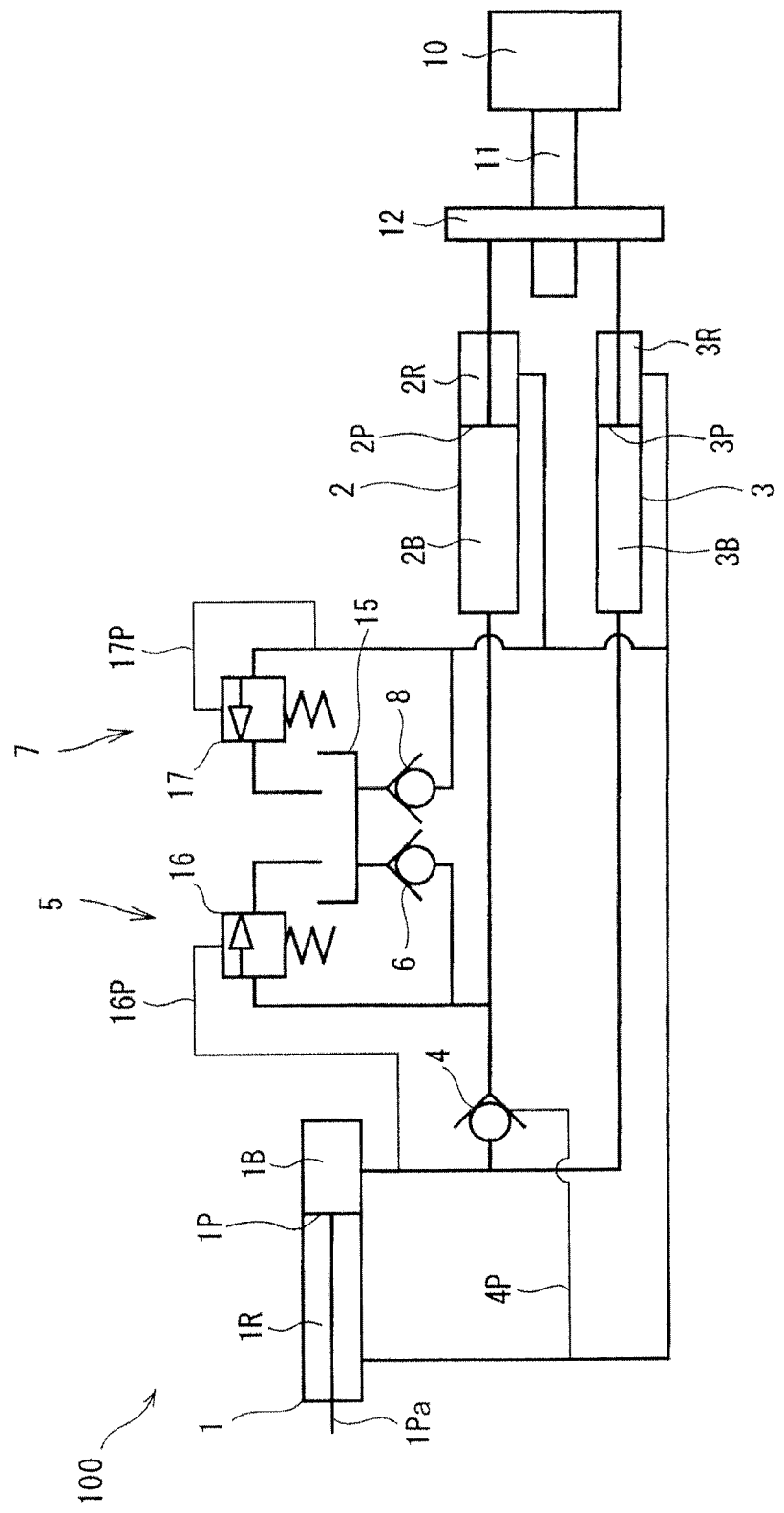

INJECTION APPARATUS

CROSS REFERENCE TO RELATED APPLICATIONS

This is a National Stage of International Application No. PCT/JP2013/065008 filed May 30, 2013, claiming priority based on Japanese Patent Application No. 2012-139270 filed Jun. 21, 2012, the contents of all of which are incorporated herein by reference in their entirety.

TECHNICAL FIELD

The present invention relates to an injection apparatus.

BACKGROUND ART

Injection apparatuses are known as an apparatus that injects a molding material into a mold and fills the mold with the molding material to form a desired product. As in the injection apparatus disclosed in Patent Document 1, for example, recent injection apparatuses apply actuating force to an injection cylinder by using an electric motor. The injection apparatus of Patent Document 1 includes an injection cylinder device for actuating an injection plunger to inject a molding material into a mold, and a conversion cylinder device for supplying hydraulic oil to the injection cylinder device. In the injection apparatus of Patent Document 1, an electric motor is used as the driving source to drive the conversion piston of the conversion cylinder device when supplying the hydraulic oil to the injection cylinder. In the injection apparatus of Patent Document 1, therefore, the driving force of the electric motor actuates the conversion piston of the conversion cylinder device to supply the hydraulic oil to the injection cylinder device, and then the supplied hydraulic oil actuates the injection piston of the injection cylinder device in the direction in which the molding material is to be injected.

PRIOR ART DOCUMENT

Patent Document

Patent Document 1: Japanese Patent Application Laid Open No. 2010-115683

SUMMARY OF THE INVENTION

Problem to be Solved by the Invention

However, an injection apparatus is generally actuated in three steps: a low-speed step, a high-speed step, and a pressure increasing step. In each of these steps, the injection piston is actuated at a desired speed to apply a desired pressure to a molding material inside a cavity. Therefore, actuating the operating cylinder by the driving force of the electric motor, as in the injection apparatus of Patent Document 1, enables more accurate control of the operating quantity of the injection cylinder than when actuating the operating cylinder by only controlling the flow rate of the hydraulic oil by means of a hydraulic pump or the like. Once a desired product is formed from the molding material, the injection apparatus retracts the injection piston. The retracting motion of the injection piston does not require accurate control. For this reason, a hydraulic pump is conventionally used to cause the retracting motion. An injection apparatus that uses a hydraulic pump to cause the retracting motion of the injection piston needs a hydraulic unit comprising the hydraulic pump and a hydraulic oil tank. This not only increases the number of parts of the injection apparatus but also makes the structure of the injection apparatus complicated and large.

The present invention was conceived in view of the foregoing problems, and an object of the present invention is to provide an injection apparatus that does not use a hydraulic unit to cause a retracting motion of an injection piston.

Means for Solving the Problem

In order to solve the above problem, the present invention includes: an injection cylinder that drives an injection plunger to inject a molding material; a first cylinder that is connected to the injection cylinder and feeds hydraulic oil to the injection cylinder and drains hydraulic oil from the injection cylinder; a second cylinder that is connected to the injection cylinder in parallel with the first cylinder and feeds hydraulic oil to the injection cylinder and drains hydraulic oil from the injection cylinder; driving means for reciprocatingly driving a piston of the first cylinder and a piston of the second cylinder; a directional control valve that is provided between one end of the injection cylinder and one end of the first cylinder and allows a flow of hydraulic oil from the first cylinder toward the injection cylinder but cuts off the flow of hydraulic oil from the injection cylinder toward the first cylinder; first flow rate adjustment means that is provided between the directional control valve and the first cylinder and that is for adjusting a flow rate of hydraulic oil between the one end of the first cylinder and the one end of the injection cylinder; and second flow rate adjustment means that is provided between the other end of the injection cylinder and the other end of the first cylinder and between the other end of the injection cylinder and the other end of the second cylinder and that is for adjusting a flow rate of hydraulic oil between the other ends of the first and second cylinders and the other end of the injection cylinder.

Advantageous Effect of the Invention

The present invention can provide an injection apparatus that does not use a hydraulic unit to cause a retracting motion of an injection piston.

BRIEF DESCRIPTION OF THE DRAWINGS

FIG. 1 This drawing shows a circuit diagram of an injection apparatus of the present invention.

MODE FOR CARRYING OUT THE INVENTION

An injection apparatus according to an embodiment of the present invention is described hereinafter.

A die-casting machine 100 functioning as an injection apparatus shown in FIG. 1 is an apparatus for injecting a metallic material (e.g., aluminum) as a molten molding material into a cavity that is formed by a fixed mold and movable mold configuring a mold, and then filling the cavity with the metallic molding material. The molding material that is injected into the mold is solidified and then demolded, resulting in a desired molded article. The die-casting machine 100 includes an injection cylinder 1 that injection-drives an injection plunger to force, into the cavity, the metallic material that is supplied to an injection sleeve communicated to the cavity. The injection plunger is connected to a tip end of a piston rod 1Pa of a piston 1P in the injection cylinder 1. An acceleration cylinder 2 as the first cylinder and a booster cylinder 3 as the second cylinder, which feed and drain hydraulic oil as an incompressible fluid (fluid), are connected to the injection cylinder 1 via piping. A bottom chamber 2B of the acceleration cylinder 2 is connected to a bottom chamber 1B of the injection cylinder 1. Furthermore, a bottom chamber 3B of the booster cylinder 3 is connected to the bottom chamber 1B of the injection cylinder 1 in parallel with the bottom chamber 2B of the acceleration cylinder 2. In the present embodiment, the stroke of a piston 2P of the acceleration cylinder 2 and the stroke of a piston 3P of the booster cylinder 3 are set at the same length. The diameter D2 of the acceleration cylinder 2 is set to be greater than the diameter D3 of the booster cylinder 3. A rod chamber 2R of the acceleration cylinder 2 is connected to a rod chamber 1R of the injection cylinder 1 via piping. A rod chamber 3R of the booster cylinder 3 is also connected to the rod chamber 1R of the injection cylinder 1 via piping. The rod chamber 2R of the acceleration cylinder 2 and the rod chamber 3R of the booster cylinder 3 are disposed in parallel with each other with respect to the rod chamber 1R of the injection cylinder 1. The piston 2P of the acceleration cylinder 2 is connected to a nut 12 via the rod chamber 2R. The piston 3P of the booster cylinder 3 is connected to the nut 12 via the rod chamber 3R. A ball screw 11 is fitted into the nut 12. The ball screw 11 can freely be rotated by a motor 10. The ball screw 11 and the nut 12 configure a ball screw mechanism. The nut 12 is configured to move in the right-left direction on FIG. 1 as the ball screw 11 rotates. The piston 2P and the piston 3P can be freely reciprocated in the acceleration cylinder 2 and the booster cylinder 3 respectively by the nut 12. In the present embodiment, the piston 2P and the piston 3P are connected to the nut 12 in such a manner as to synchronously move the same distance when the nut 12 moves. Further, in the present embodiment, the motor 10, the ball screw 11 and the nut 12 configure a driving means. The driving means in the present embodiment is a single unit.

A pilot operated check valve 4 as a directional control valve is provided on the pipe between the bottom chamber 1B located at one end of the injection cylinder 1 and the bottom chamber 2B located at one end of the acceleration cylinder 2. The pilot operated check valve 4 allows hydraulic oil to flow from the bottom chamber 2B of the acceleration cylinder 2 toward the bottom chamber 1B of the injection cylinder 1. The pilot operated check valve 4 also cuts off the flow of the hydraulic oil from the bottom chamber 1B to the bottom chamber 2B. A pilot conduit 4P for introducing pilot pressure is connected to the pilot operated check valve 4. The pilot conduit 4P is connected to the pipe between the rod chamber 1R of the injection cylinder 1 and the rod chambers 2R and 3R of the acceleration cylinder 2 and the booster cylinder 3. A flow rate adjustment circuit 5 as the first flow rate adjustment means is provided on the pipe between the pilot operated check valve 4 and the bottom chamber 2B of the acceleration cylinder 2. The flow rate adjustment circuit 5 is provided with a buffer tank 15, a pilot switching valve 16 and a check valve 6. The buffer tank 15 can temporarily store the hydraulic oil enough to supply a shortage of the hydraulic oil that may occur in the acceleration cylinder 2. The check valve 6 is provided on a pipe that extends from the buffer tank 15 to the pipe between the pilot operated check valve 4 and the bottom chamber 2B of the acceleration cylinder 2. The check valve 6 cuts off the flow of hydraulic oil from the pipe between the pilot operated check valve 4 and the bottom chamber 2B of the acceleration cylinder 2 to the buffer tank 15. Also, the check valve 6 allows the hydraulic oil to flow from the buffer tank 15 to the pipe between the pilot operated check valve 4 and the bottom chamber 2B of the acceleration cylinder 2. The check valve 6 is a hydraulic oil replenishment control valve for supplying the hydraulic oil as appropriate when the hydraulic oil is insufficient in the bottom chamber 2B of the acceleration cylinder 2. The pilot switching valve 16 is provided on a pipe that extends from the pipe between the pilot operated check valve 4 and the bottom chamber 2B of the acceleration cylinder 2 to the buffer tank 15. The pilot switching valve 16 is a valve for switching between a communicated state and a cut off state of the flow of hydraulic oil from the pipe between the pilot operated check valve 4 and the bottom chamber 2B of the acceleration cylinder to the buffer tank 15. The pilot switching valve 16 is normally biased to its cut off position by a spring. A pilot conduit 16P is connected to the pilot switching valve 16. The pilot conduit 16P is a conduit for introducing, to the pilot switching valve 16, pressure in the pipe located between the bottom chamber 1B of the injection cylinder 1 and the pilot operated check valve 4 and bottom chamber 3B of the booster cylinder 3. The pilot switching valve 16 is switched when the pilot pressure introduced from the pilot conduit 16P becomes greater than the biasing force of the spring. The pilot switching valve 16 discharges the hydraulic oil to the buffer tank 15 when switched to the communicated state. In the present embodiment, the pilot pressure of the pilot conduit 16P for switching the pilot switching valve 16 is set at a value smaller than the maximum pressure that can be applied by the acceleration cylinder 2 and the booster cylinder 3.

A flow rate adjustment circuit 7 as the second flow rate adjustment means is provided on the pipe between the rod chamber 1R located at the other end of the injection cylinder and the rod chamber 2R located at the other end of the acceleration cylinder 2. The position where the flow rate adjustment circuit 7 is provided also corresponds to the pipe between the rod chamber 1R of the injection cylinder 1 and the rod chamber 3R located at the other end of the booster cylinder 3. The flow rate adjustment circuit 7 is provided with the buffer tank 15, a pilot switching valve 17 and a check valve 8. The buffer tank 15 stores enough hydraulic oil to supply any shortage of the hydraulic oil that may occur in the acceleration cylinder 2 and the booster cylinder 3 and further the rod chambers 1R, 2R and 3R. The check valve 8 is provided on a pipe that extends from the buffer tank 15 to the pipe between the rod chamber 1R of the injection cylinder 1 and the rod chambers 2R and 3R of the acceleration cylinder 2 and booster cylinder 3. The check valve 8 is a hydraulic oil replenishment control valve for cutting off the flow of hydraulic oil from the pipe between the rod chamber 1R of the injection cylinder 1 and the rod chambers 2R and 3R of the acceleration cylinder 2 and booster cylinder 3 to the buffer tank 15. Also, the check valve 8 allows the hydraulic oil to flow from the buffer tank 15 to the pipe between the rod chamber 1R of the injection cylinder 1 and the rod chambers 2R and 3R of the acceleration cylinder 2 and booster cylinder 3. The check valve 8 is a valve for supplying the hydraulic oil as appropriate when the hydraulic oil is insufficient in the acceleration cylinder 2 and the booster cylinder 3 and further the rod chambers 1R, 2R and 3R. The pilot switching valve 17 is provided on a pipe that extends from the pipe between the rod chamber 1R of the injection cylinder 1 and the rod chambers 2R and 3R of the acceleration cylinder 2 and booster cylinder 3 to the buffer tank 15. The pilot switching valve 17 is a valve for switching between a communicated state and a cut off state of the flow of hydraulic oil from the pipe between the rod chamber 1R of the injection cylinder 1 and the rod chambers 2R and 3R of the acceleration cylinder 2 and booster cylinder 3 to the buffer tank 15. The pilot switching valve 17 is normally biased to its cut off position by a spring. A pilot conduit 17P is connected to the pilot switching valve 17. The pilot conduit 17P is a conduit for introducing, to the pilot switching valve 17, pressure in the pipe located between the rod chamber 1R of the injection cylinder 1 and the rod chambers 2R and 3R of the acceleration cylinder 2 and booster cylinder 3. The pilot switching valve is switched when the pilot pressure introduced from the pilot conduit 17P becomes greater than the biasing force of the spring. The pilot switching valve 17 discharges the hydraulic oil to the buffer tank 15 when switched to the communicated state.

The actions of the present embodiment are described next.

The injection apparatus 100 drives the injection cylinder in order to inject a molding material by means of the injection plunger. In so doing, the injection apparatus 100 supplies the hydraulic oil to the bottom chamber 1B of the injection cylinder 1 in order to expand the bottom chamber 1B such that the piston 1P is moved toward the injection plunger. The injection apparatus 100 first drives the motor 10 to rotate the ball screw 11. Consequently, the nut 12 fitted onto the ball screw 11 is moved to approach the acceleration cylinder 2 and the booster cylinder 3. When the nut 12 is moved, the pistons 2P and 3P connected to the nut 12 are moved within the acceleration cylinder 2 and booster cylinder 3, respectively. The pistons 2P and 3P are driven in synchronization with each other and moved an equal distance. When the piston 2P is moved in acceleration cylinder 2, the hydraulic oil in the bottom chamber 2B of the acceleration cylinder 2 is supplied toward the injection cylinder 1. The hydraulic oil discharged from the bottom chamber 2B passes through the pilot operated check valve 4 and flows to the bottom chamber 1B of the injection cylinder 1. At this moment, the hydraulic oil discharged from the bottom chamber 2B does not flow to the flow rate adjustment circuit 5. In the flow rate adjustment circuit 5, the pilot switching valve 16 is biased to its cut off position by the spring. In addition, the check valve 6 cuts off the flow of the hydraulic oil from the bottom chamber 2B to the buffer tank 15. When the piston 3P is moved in the booster cylinder 3, the hydraulic oil in the bottom chamber 3B of the booster cylinder 3 is supplied toward the injection cylinder 1. The hydraulic oil discharged from the bottom chamber 3B flows to the bottom chamber 1B of the injection cylinder 1 together with the hydraulic oil discharged from the bottom chamber 2B of the acceleration cylinder 2.

In the injection cylinder 1, the piston 1P is moved at high speed by the hydraulic oil that is supplied from both the acceleration cylinder 2 and the booster cylinder 3 to the bottom chamber 1B. As a result, the injection plunger injects the molding material at high speed. Note that, when the piston 1P is moved at high speed in the injection cylinder 1, the rod chamber 1R is reduced in size. The size reduction of the rod chamber 1R causes the hydraulic oil in the rod chamber 1R to be discharged from the rod chamber 1R and flow to the rod chamber 2R of the acceleration cylinder 2 and the rod chamber 3R of the booster cylinder 3. In this process, when the pressure of the hydraulic oil in each rod chamber 1R, 2R and 3R is increased, the pilot switching valve 17 of the flow rate adjustment circuit 7 switches to its communicating position. The hydraulic oil is then discharged to the buffer tank 15. In a case where the flow rate of the hydraulic oil in each rod chamber 1R, 2R and 3R becomes insufficient, hydraulic oil is supplied as appropriate from the buffer tank 15 to each rod chamber through the check valve 8.

The cavity becomes filled with the molding material as the injection cylinder 1 causes the injection plunger to continuously inject the molding material at high speed. Once the cavity becomes filled with the molding material, resistance against the direction in which the piston 1P moves occurs in the injection plunger and the injection cylinder 1. Consequently, the pressure of the hydraulic oil in the bottom chamber 1B of the injection cylinder 1 is increased by the hydraulic oil supplied from the acceleration cylinder 2 and the booster cylinder 3. The injection apparatus 100 continues to drive the motor 10 to continuously supply the injection cylinder 1 with the hydraulic oil from the acceleration cylinder 2 and the booster cylinder 3. The pressure within the pilot conduit 16P is increased as the pressure within the bottom chamber 1B is increased. When the pressure within the pilot conduit 16P exceeds a predetermined value, the pilot switching valve 16 switches from the cut off position to the communicating position. Then, the hydraulic oil discharged from the bottom chamber 2B of the acceleration cylinder 2 is caused to flow and discharged to the buffer tank 15 via the pilot switching valve 16, because the pressure of the hydraulic oil between the bottom chamber 1B of the injection cylinder 1 and the pilot operated check valve 4 becomes higher than the buffer tank 15. On the other hand, the hydraulic oil supplied from the bottom chamber 3B of the booster cylinder 3 pressurizes the hydraulic oil within the bottom chamber 1B of the injection cylinder 1. The molding material within the cavity therefore continues to be pressurized.

The hydraulic oil supplied from the bottom chamber 3B is prevented by the pilot operated check valve 4 from flowing to the buffer tank 15. In the injection cylinder 1, when the pressure within the bottom chamber 1B becomes equal to or greater than the pilot pressure of the pilot switching valve 16, only the hydraulic oil of the booster cylinder 3 is supplied to the bottom chamber 1B. This makes the supply of hydraulic oil thereto lower than when the hydraulic oil is supplied from the acceleration cylinder 2 and the booster cylinder 3. In the injection cylinder 1, high pressure is applied to the piston 1P by the hydraulic oil from the booster cylinder 3. The injection cylinder 1 and injection plunger then gradually apply pressure into the cavity. Consequently, the pressure within the cavity is increased. This pressure increasing step pressurizes and forms the molding material in the cavity.

The resistance applied from the cavity to the injection plunger and injection cylinder 1 increases as the injection plunger and injection cylinder 1 use the hydraulic oil from the booster cylinder 3 to increase the pressure within the cavity. Consequently, the resistance is transmitted from the bottom chamber 1B of the injection cylinder 1 to the booster cylinder 3 and acts as a load resistance onto the motor 10 via the nut 12 and the ball screw 11. The load torque of the motor 10 is monitored in the injection apparatus 100. When the load torque of the motor 10 becomes equal to or greater than a predetermined value, it is determined that the process of filling the cavity with the molding material is completed. Further, the injection apparatus 100 continues to drive the motor 10 to continuously apply pressure to the molding material in the cavity with a predetermined torque. Thereafter, when the molding material becomes solidified, the injection apparatus 100 stops the motor 10. After the molding material has solidified, the injection apparatus 100 determines that the molding process is completed. The injection apparatus 100 then takes out the molded article. In so doing, when separating the movable mold from the fixed mold, the injection apparatus 100 drives the motor 10 to apply a load to a part of the molded article in order to push the molded article out of the fixed mold. The molded article is demolded from the fixed mold in this manner.

Next, the injection apparatus 100 drives the motor to rotate reversely. The injection apparatus 100 then retracts the injection plunger and the injection cylinder 1. As a result of reversely rotating the motor 10, the piston 2P of the acceleration cylinder 2 and the piston 3P of the booster cylinder 3 are moved in the opposite direction by the ball screw 11 and the nut 12. Consequently, in the booster cylinder 3, the rod chamber 3R is reduced in size and the bottom chamber 3B is increased. At the same time, in the acceleration cylinder 2, the piston 2P is moved and thereby the rod chamber 2R is reduced in size. The bottom chamber 2B of the acceleration cylinder 2 then is increased. Size reduction of the rod chambers 2R and 3R causes the hydraulic oil, which is discharged from the rod chambers 2R and 3R, to flow to the rod chamber 1R of the injection cylinder 1. When the hydraulic oil flows into the rod chamber 1R of the injection cylinder 1, pressure is applied to the piston 1P of the injection cylinder 1. This consequently increases the pressure within the piping connecting the rod chamber 1R and the rod chambers 2R and 3R to each other, and thereby the pilot pressure from the pilot conduit 4P acts on the pilot operated check valve 4 to open the pilot operated check valve 4. The piston 1P of the injection cylinder 1 is moved so as to reduce the bottom chamber 1B in size as a result of the hydraulic oil flowing into the rod chamber 1R. Consequently, in response to the size reduction of the bottom chamber 1B, the hydraulic oil in the bottom chamber 1B flows to the bottom chamber 2B of the acceleration cylinder 2 and the bottom chamber 3B of the booster cylinder 3. As a result, the amount of hydraulic oil in the rod chamber 1R of the injection cylinder 1 is increased, while the amount of hydraulic oil in the bottom chamber 1B is decreased, thereby moving the piston 1P. Subsequently, the injection cylinder 1 and the injection plunger are retracted. Once the injection plunger and the injection cylinder 1 are retracted to predetermined positions, the hydraulic oil no longer flows out of the bottom chamber 1B of the injection cylinder 1. At this moment, the piston 2P of the acceleration cylinder 2 and the piston 3P of the booster cylinder 3 are not yet returned to predetermined positions and therefore continue to return to the predetermined positions. The shortage of hydraulic oil which occurs due to the size increase of the bottom chambers 2B and 3B is replenished with the hydraulic oil from the buffer tank 15 via the check valve 6. Once the piston 2P of the acceleration cylinder 2 and the piston 3P of the booster cylinder 3 are retracted to the predetermined positions, one cycle of injection molding is ended.

The injection apparatus 100 of the present embodiment has the following effects.

(1) In the injection apparatus 100 of the present embodiment, the acceleration cylinder 2 and the booster cylinder 3 are disposed in parallel with each other with respect to the injection cylinder 1. The acceleration cylinder 2 and the booster cylinder 3 are driven synchronously by the motor 10, the ball screw 11 and the nut 12. Thus, the driving means comprising the single motor 10, ball screw 11 and nut 12 can realize high injection speed and injection pressure.

(2) The driving means of the injection apparatus 100 is a single structure comprising the motor 10, the ball screw 11 and the nut 12. Compared to a construction in which the acceleration cylinder 2 and the booster cylinder 3 are driven by a plurality of driving means, the construction of the present embodiment can reduce the number of parts and the cost of the injection apparatus 100. In addition, since only the single-structured driving means need be provided in the injection apparatus 100, reduction in the space for and the size of the injection apparatus 100 can be accomplished.

(3) The injection cylinder 1 of the injection apparatus 100 comprises the acceleration cylinder 2, the booster cylinder 3, the flow rate adjustment circuit 5 and the flow rate adjustment circuit 7, and is driven by the motor 10. Such a construction makes the retracting motion of the injection cylinder 1 easy and eliminates the need to provide the retracting motion with a hydraulic pump. Additionally, compared to a construction in which a hydraulic pump is provided, the construction of the present embodiment allows a reduction of the cost and the size of the injection apparatus 100.

(4) The injection apparatus 100 is provided with the flow rate adjustment circuit 5 and the flow rate adjustment circuit 7. Therefore, even when the amount of hydraulic oil varies due to a leak thereof from the sealed parts in the injection apparatus 100 or the like, the amount of hydraulic oil can be brought back to its original level, so the injection apparatus 100 can behave in a stable manner.

(5) The injection apparatus 100 is provided with the flow rate adjustment circuit 5. The flow of the hydraulic oil in the acceleration cylinder 2 can be easily switched by the flow rate adjustment circuit 5.

(6) The flow rate adjustment circuit 5 comprises the buffer tank 15, the check valve 6 and the pilot switching valve 16. The pilot switching valve 16 can be freely switched by means of the pilot pressure. Therefore, it is not necessary to provide the flow rate adjustment circuit 5 with new driving means, providing a simple structure of the flow rate adjustment circuit 5. As with the flow rate adjustment circuit 5, the flow rate adjustment circuit 7 can also have a simple structure without requiring new driving means.

(7) The diameter D2 of the acceleration cylinder 2 is set to be greater than the diameter D3 of the booster cylinder 3. Therefore, when driving the injection cylinder 1, high-speed drive of the injection cylinder 1 can be accomplished by supplying a larger amount of hydraulic oil by using the piston 2P of the acceleration cylinder 2 with the larger diameter D2.

The present invention is not limited to the foregoing embodiment. Modifications of the present invention are described hereinbelow.

The acceleration cylinder 2 and the booster cylinder 3 according to the embodiment employ different diameters and the same manner stroke but are not limited to such construction. The size of each cylinder can be changed as appropriate. For instance, the diameter D2 of the acceleration cylinder 2 and the diameter D3 of the booster cylinder 3 may be equal to each other. The diameter D2 may be smaller than the diameter D3. It is preferred that the diameters of the pistons 2P and 3P be set appropriately in accordance with the diameter D1 of the piston 1P of the injection cylinder 1. In addition, the stroke of the piston 2P need not be the same as the stroke of the piston 3P.

The flow rate adjustment circuit 5 is not limited to the construction described in the embodiment. For example, an electromagnetic switching valve may be used in place of the flow rate adjustment circuit 5. Further, the above construction may have a construction where the position of the injection cylinder 1 is detected with a limit switch or the like and the switching valve is switched at a predetermined position of the injection cylinder 1. Furthermore, the above construction may have a construction where an encoder or the like is provided in the motor 10 and the switching valve is switched based on the driving amount of the motor 10 or the like. Also, a switching valve may be used in place of the check valve 6.

The driving means according to the embodiment is not limited to the structure of a ball screw. The construction of the driving means may be changed as appropriate as long as it can drive the piston 2P of the acceleration cylinder 2 and the piston 3P of the booster cylinder 3 by means of the motor 10. A plurality of pairs of the ball screw 11 and the nut 12 may be provided.

The driving means of the injection apparatus 100 does not have to be configured as a single unit. For example, the acceleration cylinder 2 and the booster cylinder 3 may be driven by separate driving means. The acceleration cylinder 2 and the booster cylinder 3 may be driven separately as long as the flow rates therein are balanced.

The construction of the embodiment uses the pilot operated check valve 4 as a directional control valve but is not limited thereto. An electromagnetic switching valve may be used instead.

EXPLANATION OF REFERENCE NUMERALS

1 Injection cylinder, 1B Bottom chamber, 1P Piston, 1Pa Piston rod, 1R Rod chamber, 2 Acceleration cylinder, 2B Bottom chamber, 2P Piston, 2R Rod chamber, 3 Booster cylinder, 3B Bottom chamber, 3P Piston, 3R Rod chamber, 4 Pilot operated check valve, 4P Pilot conduit, 5 Flow rate adjustment circuit, 6 Check valve, 7 Flow rate adjustment circuit, 8 Check valve, 10 Motor, 11 Ball screw, Nut, 15 Buffer tank, 16 Pilot switching valve, 16P Pilot conduit, 17 Pilot switching valve, 17P Pilot conduit, 100 Die-casting machine (injection apparatus).

The invention claimed is:

1. An injection apparatus, comprising:
   an injection cylinder driving an injection plunger to inject a molding material;
   a first cylinder connected to the injection cylinder, the first cylinder feeding hydraulic oil to the injection cylinder and draining hydraulic oil therefrom;
   a second cylinder connected to the injection cylinder in parallel with the first cylinder, the second cylinder feeding hydraulic oil to the injection cylinder and draining hydraulic oil therefrom;
   driving means for reciprocatingly driving a piston of the first cylinder and a piston of the second cylinder;
   a directional control valve provided between one end of the injection cylinder and one end of the first cylinder, the directional control valve allowing a flow of hydraulic oil from the first cylinder toward the injection cylinder but cutting off the flow of hydraulic oil from the injection cylinder toward the first cylinder;
   first flow rate adjustment means provided between the directional control valve and the first cylinder, the first flow rate adjustment means being for adjusting a flow rate of hydraulic oil between the one end of the first cylinder and the one end of the injection cylinder; and
   second flow rate adjustment means provided between the other end of the injection cylinder and the other end of the first cylinder and between the other end of the injection cylinder and an other end of the second cylinder, the second flow rate adjustment means being for adjusting a flow rate of hydraulic oil between the other ends of the first and second cylinders and the other end of the injection cylinder.

2. The injection apparatus according to claim 1, wherein the first flow rate adjustment means includes:
   a buffer tank capable of temporarily storing hydraulic oil;
   a pilot switching valve capable of discharging to the buffer tank the hydraulic oil present between the directional control valve and the one end of the first cylinder; and
   a replenishment control valve capable of supplying the hydraulic oil in the buffer tank between the directional control valve and the one end of the first cylinder.

3. The injection apparatus according to claim 1, wherein the second flow rate adjustment means includes:
   a buffer tank capable of temporarily storing hydraulic oil;
   a pilot switching valve capable of discharging to the buffer tank the hydraulic oil present between the other end of the injection cylinder and the other end of the first cylinder and between the other end of the injection cylinder and the other end of the second cylinder; and
   a replenishment control valve capable of supplying hydraulic oil between the other end of the injection cylinder and the other end of the first cylinder and between the other end of the injection cylinder and the other end of the second cylinder.

* * * * *